(12) United States Patent
Krishnan et al.

(10) Patent No.: US 10,275,155 B2
(45) Date of Patent: Apr. 30, 2019

(54) METHODS FOR AUTONOMOUS DISK OWNERSHIP ASSIGNMENT OF NODES IN A STORAGE NETWORK WITH A MULTI-PATH CONFIGURATION AND DEVICES THEREOF

(71) Applicant: NetApp, Inc., Sunnyvale, CA (US)

(72) Inventors: Sasidharan Krishnan, Fremont, CA (US); Kalaivani Arumugham, Sunnyvale, CA (US); Kyle Sterling, Sunnyvale, CA (US); Susan Coatney, Sunnyvale, CA (US); Douglas Coatney, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 200 days.

(21) Appl. No.: 15/156,848

(22) Filed: May 17, 2016

(65) Prior Publication Data

US 2017/0336993 A1    Nov. 23, 2017

(51) Int. Cl.
*G06F 3/06*    (2006.01)

(52) U.S. Cl.
CPC ........... *G06F 3/0607* (2013.01); *G06F 3/067* (2013.01); *G06F 3/0635* (2013.01); *G06F 3/0688* (2013.01)

(58) Field of Classification Search
CPC .... G06F 3/0607; G06F 3/0619; G06F 3/0635; G06F 3/0688; G06F 3/0689
See application file for complete search history.

(56) References Cited

U.S. PATENT DOCUMENTS

| 2003/0061491 | A1* | 3/2003 | Jaskiewicz | ............ | H04L 63/102 |
| | | | | | 713/182 |
| 2006/0206671 | A1* | 9/2006 | Aiello | ............ | G06F 3/0607 |
| | | | | | 711/148 |
| 2013/0198135 | A1* | 8/2013 | Akirav | ............ | G06F 17/30212 |
| | | | | | 707/634 |

\* cited by examiner

*Primary Examiner* — Aracelis Ruiz
(74) *Attorney, Agent, or Firm* — Pepper Hamilton LLP

(57) ABSTRACT

A method, non-transitory computer readable medium, and storage node computing device that identifies a subset of a plurality of sections of a shelf that is unowned based on a determined ownership status of a plurality of storage devices hosted by the shelf. Obtained section discriminant data is applied to one of a plurality of ordered storage node identifiers to identify one section of the subset of the sections. Ownership of one or more of the storage devices corresponding to the one section is obtained.

18 Claims, 5 Drawing Sheets

METHODS FOR AUTONOMOUS DISK OWNERSHIP ASSIGNMENT OF NODES IN A STORAGE NETWORK WITH A MULTI-PATH CONFIGURATION AND DEVICES THEREOF

FIELD

This technology relates to data storage management and more particularly to methods for autonomous assignment of disk ownership in a storage network with a multi-path configuration and devices thereof.

BACKGROUND

Storage networks are often configured to include a number of storage devices that are owned and managed by one or more storage controller devices. When the storage networks are first established, an initial assignment of storage devices to storage controller devices is made. However, as changes are implemented in the storage network, the assignment of ownership over the storage devices by the storage controller devices must also change to meet the requirements imposed by the changes to the storage network.

Many existing storage networks employ a significant proportion of solid state drives (SSDs) as storage devices. Due to their high throughput capabilities, SSDs are highly accessible by multiple access paths, much more so than traditional hard disk drives. As a result, many storage networks, especially those with a high proportion of SSDs, may benefit from more efficient use of those multiple access paths. Specifically, the input or output performance of the storage devices may be significantly impacted based on how the multiple access paths are handled. Accordingly, a storage network may realize performance benefits by improving the effectiveness with which the multiple access paths and the devices connected by those multiple access paths are managed.

Among existing ways of managing multiple access paths and assigning ownership for storage devices, manual intervention is common. Such a way of assigning storage device ownership is, in addition to being time consuming and labor intensive, also error prone and offers less than optimal performance in the storage network. Additionally, current autonomous assignment methods often result in suboptimal assignment such that path(s) to a disk shelf from a storage controller are not utilized or there is an imbalance in utilization of one or more paths to the disk shelf.

DETAILED DESCRIPTION

Figure 1:
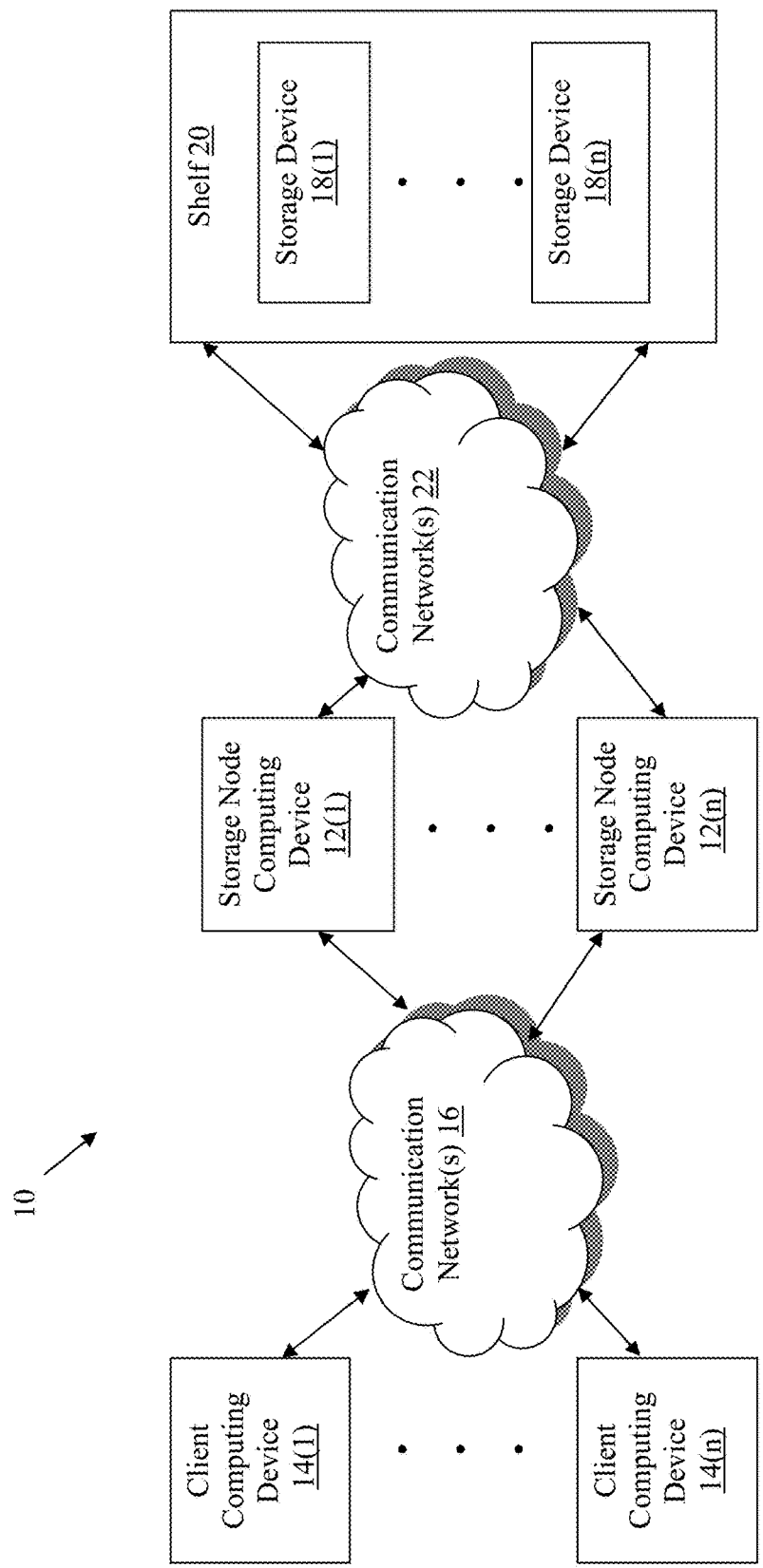
FIG. 1 is a block diagram of a network environment with exemplary storage node computing devices.

A network environment 10 including exemplary storage node computing devices 12(1)-12(n) is illustrated in FIG. 1. The storage node computing devices 12(1)-12(n) in this example are coupled to client computing devices 14(1)-14(n) via communication network(s) 16 and storage devices 18(1)-18(n) hosted by a shelf 20 via communication network(s) 22, which in other examples may be a bridge, and/or switch, although this network environment 10 can include other numbers and types of systems, devices, components, and/or elements in other configurations. Additionally, the network environment 10 may include other network devices such as one or more routers and/or switches, for example, which are well known in the art and thus will not be described herein. This technology provides a number of advantages including methods, non-transitory computer readable media, and devices that automatically assign ownership of storage devices in a shared storage environment, thereby maximizing storage device performance and reducing the number of storage conflict events which may result from invalid ownership assignment.

Figure 2:
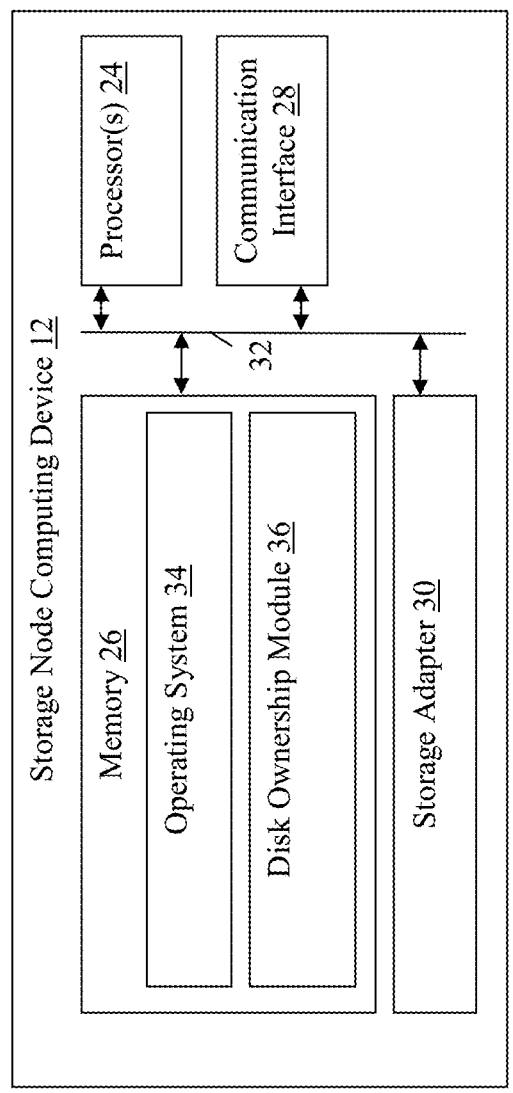
FIG. 2 is a block diagram of an exemplary one of the storage node computing devices shown in FIG. 1.

Referring to FIG. 2, a block diagram of one of the exemplary storage node computing devices 12(1)-12(n) is illustrated. The storage node computing device 12 in this particular example generally provides file services relating to the organization of data on the storage devices 18(1)-18(n) on behalf of the client computing devices 14(1)-14(n). In this example, the storage node computing device 12 includes processor(s) 24, a memory 26, a communication interface 28, and a storage adapter 30, which are coupled together by a bus 32 or other communication link.

The processor(s) 24 of the storage node computing device 12 may execute a program of stored instructions for one or more aspects of the this technology, as described and illustrated by way of the embodiments herein, although the processor(s) 24 could execute other numbers and types of programmed instructions. The processor(s) 24 in the storage node computing device 12 may include one or more central processing units (CPUs) or general purpose processors with one or more processing cores, for example.

The memory 26 of the storage node computing device 12 may include any of various forms of read only memory (ROM), random access memory (RAM), flash memory, non-volatile or volatile memory, or the like, or a combination of such devices, for example. In this example, the memory 26 includes an operating system 34 and a disk ownership module 36, although other types and/or numbers of applications or modules can also be included in other examples.

The operating system 34 is configured to functionally organize stored data by invoking storage operations to facilitate file services provided by the storage node computing device 12. In particular, the operating system 34 implements a file system to logically organize data as a hierarchical structure of directories and files on the storage devices 18(1)-18(n). Accordingly, the operating system 34 cooperates with the storage adapter 30 to access data requested by the client computing devices 14(1)-14(n) and stored on the storage devices 18(1)-18(n), among other functions.

The disk ownership module 36 is configured to manage the detection of storage conflict events in the storage node computing device 12 and, in particular, the automatic assignment of a portion of the storage devices 18(1)-18(n) to the storage node computing device 12. The disk ownership module 36 is preconfigured to store an indication of the conditions under which the storage devices 18(1)-18(n) are considered to experience a storage conflict event and, optionally, the arrangement of the storage node computing device 12 in the network environment 10 (e.g., as one storage node computing device of a high availability (HA)

pair). The disk ownership module 36 is further configured to obtain ownership of a plurality of the storage devices 18(1)-18(n) for use by the storage node computing device 12, as described and illustrated in more detail later.

The communication interface 28 of the storage node computing device 12 can include one or more network interface controllers (NICs) for operatively coupling and communicating between the storage node computing device 12 and the client computing devices 14(1)-14(n), which are coupled together by the communication network(s) 16, although other types and numbers of communication networks or systems with other types and numbers of connections and configurations to other devices and elements also can be used.

By way of example only, the communication network(s) 16 can use TCP/IP over Ethernet and industry-standard protocols, including NFS, CIFS, SOAP, XML, LDAP, and SNMP, although other types and numbers of communication networks, can be used. The communication network(s) 16 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) 16 may also comprise any local area network and/or wide area network (e.g., Internet), although any other type of traffic network topologies may be used.

The storage adapter 30 can cooperate with the operating system 34 to access data requested by the client computing devices 14(1)-14(n). The data may be stored on the storage devices 18(1)-18(n) in logical volumes, for example. The storage adapter 30 includes input/output (I/O) or communication interface circuitry that couples to the storage devices 18(1)-18(n) over an I/O interconnect arrangement such as a conventional high-performance, Fibre Channel serial link topology, SAS, SCSI, or SATA, for example. The storage adapter 28 can communicate with the storage devices 18(1)-18(n) over a network, bridge, and/or switch (not shown).

Referring back to FIG. 1, each of the client computing devices 14(1)-14(n) in this example includes a processor, a memory, a communication interface, and optionally an input device and a display device, which are coupled together by a bus or other link, although each of the client computing devices 14(1)-14(n) can have other types and numbers of components or other elements and other numbers and types of network devices could be used. The client computing devices 14(1)-14(n) may run interface applications that provide an interface to make requests for and send content and/or data to the storage node computing device 12 via the communication network(s) 16, for example. Each of the client computing devices 14(1)-14(n) may be a conventional personal computer, a tablet computing device, a smart phone, a virtual machine running in a cloud, an application server hosting applications that utilize backend storage, or other processing and/or computing device, for example.

The storage devices 18(1)-18(n) collectively comprise a storage cluster and can be hard disk drives, solid state drives (SSDs), flash drives, optical disk-based storage, any combination thereof, or any other type of stable, non-volatile storage suitable for storing files or objects in storage volumes for short or long term retention, for example. The storage devices 18(1)-18(n) optionally host one or more volumes based on a Redundant Array of Inexpensive Disks (RAID) architecture or other topology facilitating data persistency, although other types and numbers of volumes in other topologies can also be used.

In this particular example, the storage devices 18(1)-18(n) are solid state drives comprising flash memory and collectively comprise an all flash array. In this example, the storage devices 18(1)-18(n) are located at slots in the shelf 20. While the shelf 20 is illustrated in FIG. 1 as being separate from the storage node computing device 12(1)-12(n), the storage devices 18(1)-18(n) can also be hosted by a same enclosure, rack, or cabinet as one or more of the storage node computing devices 12(1)-12(n), for example, and the storage devices 18(1)-18(n) can also be located elsewhere in the network environment 10.

Although examples of the plurality of storage node computing devices 12(1)-12(n), the plurality of client computing devices 14(1)-14(n), and the plurality of storage devices 18(1)-18(n), are described and illustrated herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples also may be embodied as one or more non-transitory computer readable media having instructions stored thereon for one or more aspects of the present technology, as described and illustrated by way of the examples herein, which when executed by the processor, cause the processor to carry out the steps necessary to implement the methods of this technology, as described and illustrated with the examples herein.

Figure 3:
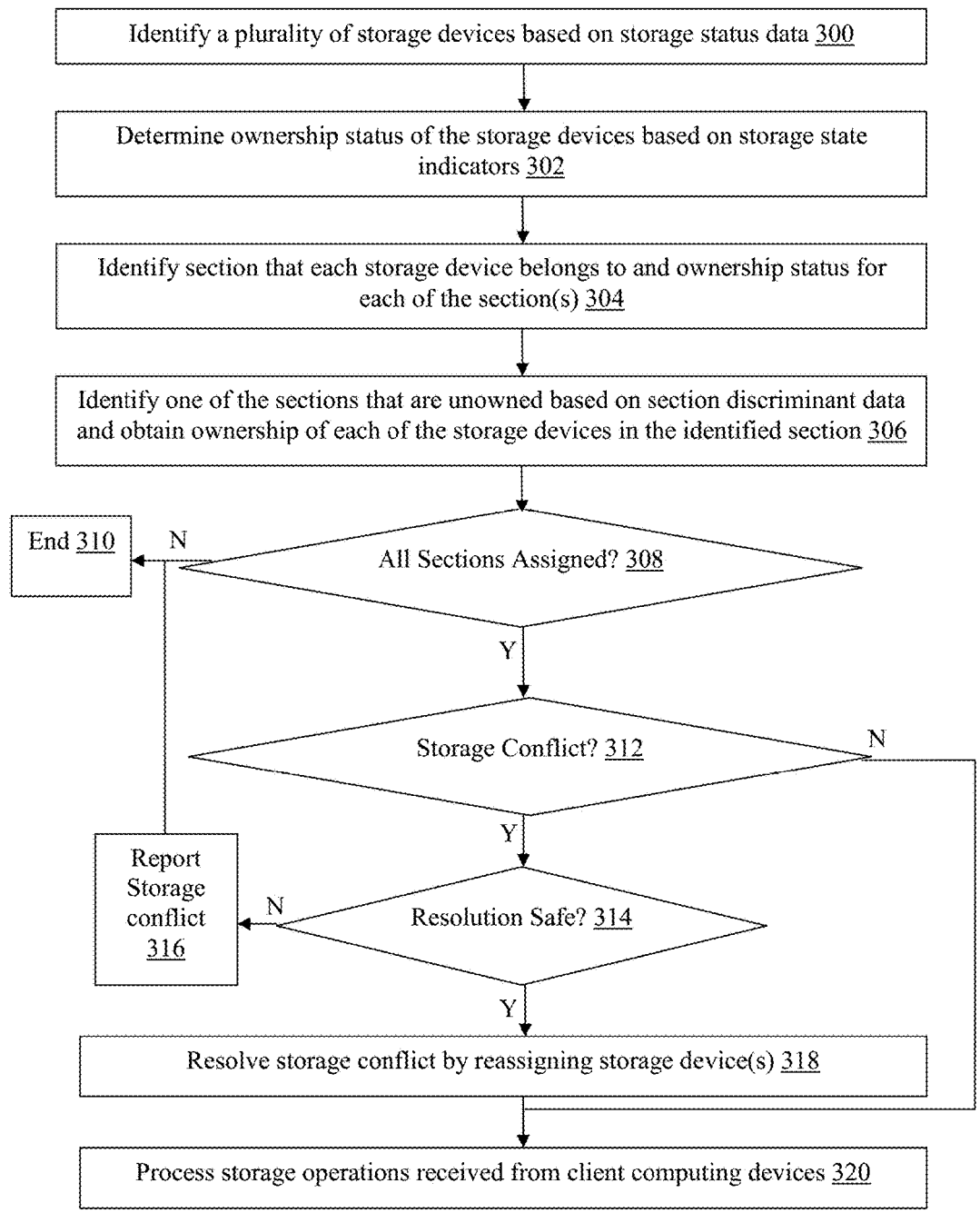
FIG. 3 is a flow chart of an exemplary method for managing ownership assignment of storage devices.

An exemplary method for autonomous disk ownership assignment in a shared storage environment will now be described with reference to FIGS. 1-5. Referring more specifically to FIG. 3, the exemplary method begins in step 300, in which one of the storage node computing devices 12(1)-12(n) identifies the plurality of storage devices 18(1)-18(n) based on storage status data that includes a plurality of unique storage identifiers that correspond to the storage devices 18(1)-18(n). The plurality of unique storage identifiers may include device serial numbers, although other types of identifiers that are associated with the storage devices 18(1)-18(n) may also be used to uniquely identify each of the storage devices 18(1)-18(n) in other examples.

In step 302, the one of the storage node computing devices 12(1)-12(n) determines an ownership status (e.g., owned or not owned) for the storage devices 18(1)-18(n). The determination of the ownership status can be based on the storage status data obtained in step 300, which can be obtained based on a query using a storage device driver for each of the storage devices 18(1)-18(n), for example. The ownership status of the storage devices 18(1)-18(n) may subsequently be used in later assignment of the storage devices 18(1)-18(n) to the storage node computing devices 12(1)-12(n), as described and illustrated in more detail later. Optionally, the one of the storage node computing devices 12(1)-12(n) can determine the ownership status of the storage devices 18(1)-18(n) until one of the storage devices 18(1)-18(n) is determined to be unowned.

In step 304, the one of the storage node computing devices 12(1)-12(n) identifies a section to which each of the storage devices 18(1)-18(n) belongs and ownership status for each of the sections. Accordingly, if the one of the storage node computing devices 12(1)-12(n) determines that one of the storage devices 18(1)-18(n) is unowned, then a section of the storage device 18(1)-18(n) that includes the one of the storage devices 18(1)-18(n) is unowned and requires assignment. The one of the storage node computing devices 12(1)-12(n) can be preconfigured with an indication of each of the sections. For example, the one of the storage node computing devices 12(1)-12(n) can be configured with an indication that a set of the storage devices 18(1)-18(n) in slots in the first half of the shelf 20 will be in one section and another set of the storage devices 18(1)-18(n) in slots in the second half of the shelf will be in another section, although other section configurations and numbers of sections can also be used.

In step 306, the one of the storage node computing devices 12(1)-12(n) identifies one of the sections that is unowned based on section discriminant data and obtains ownership of each of a subset of the storage devices 18(1)-18(n) that is in the identified, unowned section. Accordingly, the one of the storage node computing devices 12(1)-12(n) identifies the subset of the storage devices 18(1)-18(n) that are in the unowned section by applying section discriminant data in this example. The one of the storage node computing devices 12(1)-12(n) can be preconfigured with the section discriminant data or the section discriminant data can be obtained from a location in the network environment 10.

The section discriminant data includes value(s) or expression(s) that can be applied to an ordered representation of identifiers for the storage node computing devices 12(1)-12(n) in order to mathematically associate one of the storage node computing devices 12(1)-12(n) to a section, and corresponding subset of the storage devices 18(1)-18(n). By using the section discriminant data, the one of the storage node computing devices 12(1)-12(n) performs assignment of the storage devices 18(1)-18(n) automatically and while avoiding conflicts. Ownership of the subset of the storage devices 18(1)-18(n), in the section of the shelf 20 associated with the one of the storage node computing devices 12(1)-12(n) based on the application of the section discriminant data, can be obtained using a storage device driver for each of the subset of the storage devices 18(1)-18(n).

Figure 4:
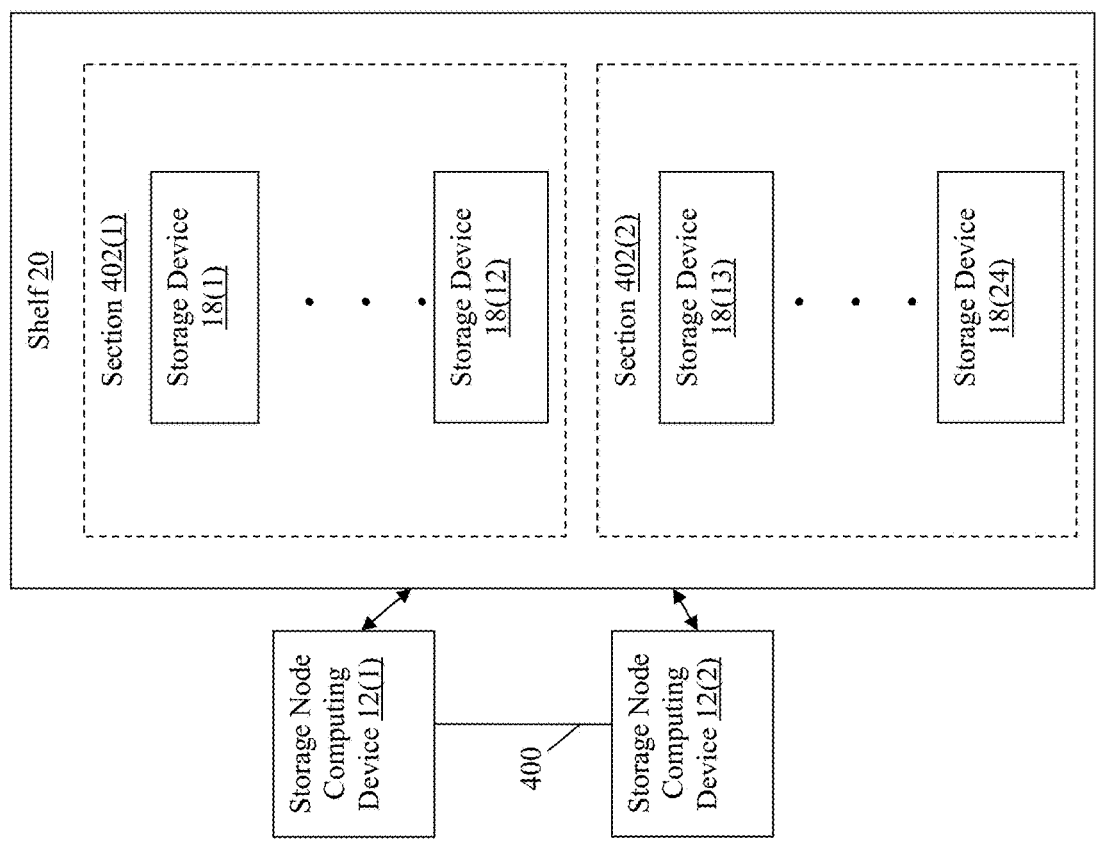
FIG. 4 is a block diagram of two exemplary storage node computing devices coupled to a shelf hosting twenty four data storage devices.

Referring more specifically to FIG. 4, two exemplary storage node computing devices 12(1) and 12(2) operating as a high availability (HA) pair coupled to a shelf 20 hosting storage devices 18(1)-18(24) are illustrated. The storage node computing devices 12(1) and 12(2) are coupled together via an HA interconnect 400 in this example, which facilitates the transfer of information between the storage node computing devices 12(1) and 12(2) (e.g., mirrored storage operations that can be replayed in the event of a failure of one of the storage node computing devices 12(1) or 12(2)).

In this example, the shelf includes sections 402(1) including storage devices 18(1)-18(12) and section 402(2) including storage devices 18(13)-18(24). Accordingly, the storage node computing device 12(1), for example, can determine that storage devices 18(1)-18(24) are unowned, and that therefore sections 402(1) and 402(2) are unowned. The storage node computing device 12(1) can then apply the section discriminant data to an ordered representation of an identifier for the storage node computing device 12(1) to mathematically identify and associate section 402(2), for example, to the storage node computing device 12(1). Accordingly, the section discriminant data facilitates a unique mapping of storage node computing devices 12(1) and 12(2) to sections 402(1) and 402(2) in this example.

If the storage node computing device 12(2) has multiple paths to the shelf 20, the assignment of the storage devices 18(13)-18(24) to the storage node computing device 12(2) facilitates improved utilization of the paths with respect to conventional assignment of shared storage in a shelf that is based on a bay policy. More specifically, assignment based on a bay policy would result, by way of example, in the even numbered ones of the storage devices 18(1)-18(24) (e.g., located in even bays or slots of the shelf 20) being assigned to the storage node computing device 12(1) and the odd numbered ones of the storage devices 18(1)-18(24) being assigned to the storage node computing device 12(2).

Since the storage node computing devices 12(1) and 12(2) may be configured to use a first of two paths to the shelf 20 in order to access even numbered ones of the storage devices 18(1)-18(24) and a second of the two paths to the shelf 20 in order to access odd numbered ones of the storage devices 18(1)-18(24), each of the storage node computing devise 12(1) and 12(2) would use only one path in operation. More specifically, the storage node computing device 12(1) in this example would use only the first path and the storage node computing device 12(2) would use only the second path. However, with this technology, both paths would be used by both storage node computing devices 12(1) and 12(2) since the sections corresponding to each of the storage node computing devices 12(1) and 12(2) include both even and odd numbered ones of the storage devices 18(1)-18(24).

Figure 5:
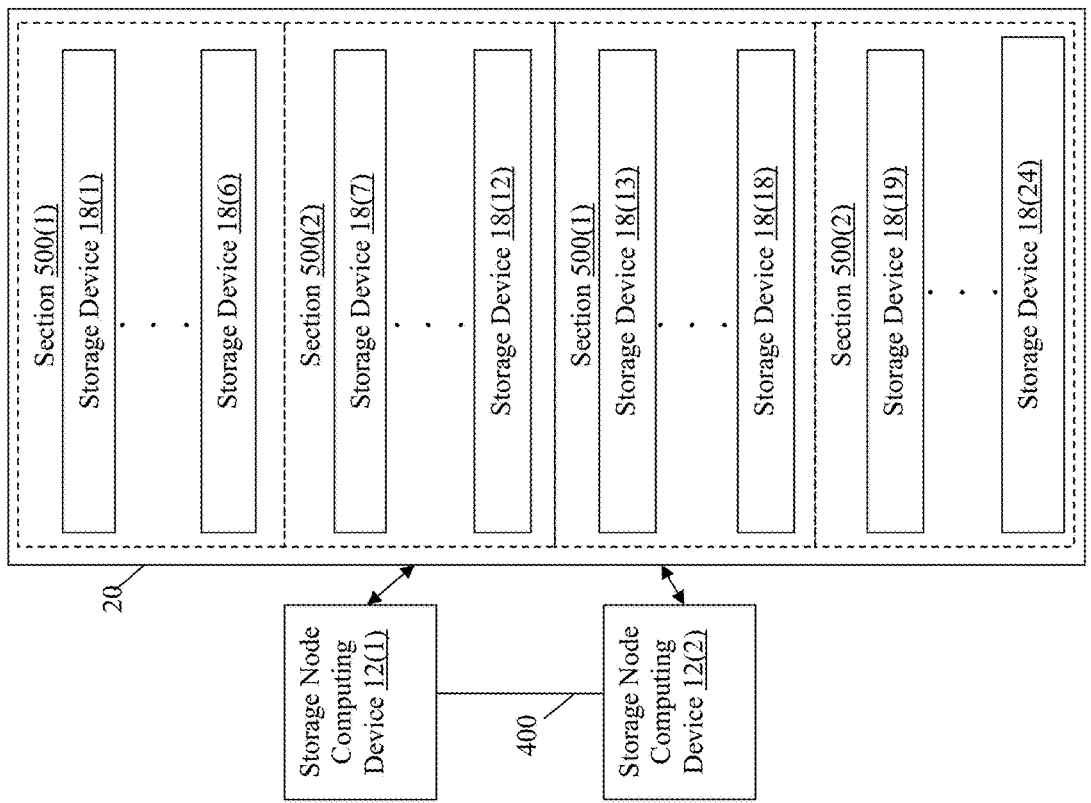
FIG. 5 is a block diagram of two exemplary storage node computing devices coupled to a shelf hosting twenty four data storage devices arranged in sections according to an alternating pattern.

As another example, and referring more specifically to FIG. 5, a block diagram of the exemplary storage node computing devices 12(1) and 12(2) of FIG. 4 operating as an HA pair coupled to the shelf 20 hosting storage devices 18(1)-18(24) arranged in sections 500(1) and 500(2) according to an alternating pattern is illustrated. In this example, the storage node computing device 12(1), which identified section 500(2) in step 306 by applying the section discriminant data, obtains ownership of storage devices 18(7)-18(12) and 18(19)-18(24). In this particular example, the storage node computing devices 12(1) and 12(2) are preconfigured with a pattern (e.g., "ABAB") corresponding to the section layout of the shelf. Other numbers of storage node computing devices or storage devices can be used in other examples, and other types and number of patterns can also used with this technology.

Referring back to FIG. 3, the one of the storage node computing devices 12(1)-12(n) determines in step 308 whether all sections of the shelf 20 are now assigned based on the ownership status determined in step 304. If the one of the storage node computing devices 12(1)-12(n) determines that all sections of the shelf 20 are not assigned, then the No branch is taken to step 310 and the process ends. If the process ends in step 310, then another of the storage node computing devices 12(1)-12(n) has yet to perform, or is still in the process of performing, steps 300-306. However, if the one of the storage node computing devices 12(1)-12(n) determines in step 308 that all sections are currently assigned, then the Yes branch is taken to step 312.

In step 312, the one of the storage node computing devices 12(1)-12(n) determines whether there is a storage conflict. A storage conflict occurs when one or more of the storage devices 18(1)-18(n) in a section are owned by different ones of the storage node computing devices 12(1)-12(n). As explained earlier, there cannot be a storage conflict when the assignment of the storage devices 18(1)-18(n) is performed with this technology unless there is manual intervention that manually assigns one or more of the storage devices 18(1)-18(n) to one or more of the storage node computing devices 12(1)-12(n).

A storage conflict can be identified by scanning the ownership of the storage devices 18(1)-18(n) using a storage device driver for the storage devices 18(1)-18(n), for example, and determining whether multiple of the storage node computing devices 12(1)-12(n) own one or more of the storage devices 18(1)-18(n) in one or more of the sections.

In another example, storage conflicts can be detected "on-the-fly" if the one of the storage node computing devices 12(1)-12(n) finds a single one of the storage devices 18(1)-18(n) that is assigned to an invalid section. Such a determination can be made prior to the determination in step 308 whether all of the sections have been assigned. Other types of storage conflicts including pattern conflicts (e.g., "ABBA" instead of "ABAB"), and other methods of identifying storage conflicts can also be used. If the one of the storage node computing devices 12(1)-12(n) determines that there is a storage conflict, then the Yes branch is taken to step 314.

In step 314 in this particular example, the one of the storage node computing devices 12(1)-12(n) determines whether resolution of the storage conflict is safe. A storage conflict can be resolved by reassignment of one or more of the storage devices 18(1)-18(n). However, the resolution is not safe if the storage devices 18(1)-18(n) requiring reassignment currently store valid data. Accordingly, if the one of the storage node computing devices 12(1)-12(n) determines that resolution of the storage conflict is not safe, then the No branch is taken to step 316.

In step 316, the one of the storage node computing devices 12(1)-12(n) reports the storage conflict, such as by outputting information regarding the storage conflict (e.g., an indication of the conflicting ones of the storage devices 18(1)-18(n)) to one of the client computing devices 14(1)-14(n) or an administrator device, for example. Subsequent to reporting the storage conflict, the one of the storage node computing devices 12(1)-12(n) proceeds to step 310 and the process ends.

However, if the one of the storage node computing devices 12(1)-12(n) determines in step 314 that resolving the storage conflict is safe, then the Yes branch is taken to step 318. In step 318, the one of the storage node computing devices 12(1)-12(n) resolves the storage conflict by automatically reassigning one or more of the storage devices 18(1)-18(n). Subsequent to resolving the storage conflict, the one of the storage node computing devices 12(1)-12(n) proceeds to process storage operations received from the client computing devices 14(1)-14(n) and/or perform other tasks related to the management and/or operation of the storage network.

Accordingly, as illustrated and described by way of the examples herein, this technology provides methods, non-transitory computer readable media and devices for more efficient assignment of disk ownership to nodes in a storage network with a multi-path configuration. More specifically, this technology facilitates autonomous assignment of storage devices and automatic avoidance of assignment conflicts. This technology also facilitates a more balanced assignment of storage devices and increases the overall performance of storage nodes in a storage network with multiple access paths. In particular, utilization of paths to storage devices from storage nodes is advantageously improved with this technology.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
   applying, by a computing device, obtained section discriminant data to one or more of a plurality of ordered storage node identifiers to identify an unowned section of a plurality of sections, the unowned section associated with two or more of a plurality of storage devices and the one or more of the ordered storage node identifiers corresponding to one of a plurality of storage nodes associated with the ordered storage node identifiers; and
   establishing, by the computing device, ownership by the one of the storage nodes of the two or more of the storage devices associated with the unowned section.

2. The method as set forth in claim 1, wherein the section discriminant data comprises a pattern corresponding to a section layout of a shelf that includes the sections and hosts the storage devices.

3. The method as set forth in claim 1, wherein the section discriminant data facilitates a unique mapping of the sections to the storage nodes.

4. The method as set forth in claim 1, further comprising identifying, by the computing device, the unowned section based on a determined ownership status of the storage devices.

5. The method as set forth in claim 1, further comprising resolving, by the computing device, a storage conflict comprising reassigning one or more conflicting ones of the storage devices, when a determination indicates that resolution of the storage conflict is safe based on whether each of the conflicting ones of the storage devices currently stores valid data.

6. The method as set forth in claim 1, wherein the storage devices comprise solid state drives comprising flash memory.

7. A non-transitory machine readable medium having stored thereon instructions for autonomous assignment of disk ownership in a storage network comprising machine executable code which when executed by at least one machine, causes the machine to:
   apply obtained section discriminant data to one or more of a plurality of ordered storage node identifiers to identify an unowned section of a plurality of sections, the unowned section associated with two or more of a plurality of storage devices and the one or more of the ordered storage node identifiers corresponding to one or more of a plurality of storage nodes associated with the ordered storage node identifiers; and
   establish ownership by the one of the storage nodes of the two or more of the storage devices associated with the unowned section.

8. The non-transitory computer readable medium as set forth in claim 7, wherein the section discriminant data comprises a pattern corresponding to a section layout of a shelf that includes the sections and hosts the storage devices.

9. The non-transitory computer readable medium as set forth in claim 7, wherein the section discriminant data facilitates a unique mapping of the sections to the storage nodes.

10. The non-transitory computer readable medium as set forth in claim 7, wherein the machine executable code when executed by the machine, further causes the machine to identify the unowned section based on a determined ownership status of the storage devices.

11. The non-transitory computer readable medium as set forth in claim 7, wherein the machine executable code when executed by the machine, further causes the machine to
resolve a storage conflict comprising reassigning one or more conflicting ones of the storage devices, when a determination indicates that resolution of the storage conflict is safe based on whether each of the conflicting ones of the storage devices currently stores valid data.

12. The non-transitory computer readable medium as set forth in claim 7, wherein the storage devices comprise solid state drives comprising flash memory.

13. A computing device comprising:
a memory containing machine readable medium comprising machine executable code having stored thereon instructions for autonomous assignment of disk ownership in a storage network;
a processor coupled to the memory, the processor configured to be execute the machine executable code to cause the processor to:
apply obtained section discriminant data to one or more of a plurality of ordered storage node identifiers to identify an unowned section of a plurality of sections, the unowned section associated with two or more of a plurality of storage devices and the one or more of the ordered storage node identifiers corresponding to one or more of a plurality of storage nodes associated with the ordered storage node identifiers; and
establish ownership by the one of the storage nodes of the two or more of the storage devices associated with the unowned section.

14. The device as set forth in claim 13, wherein the section discriminant data comprises a pattern corresponding to a section layout of a shelf that includes the sections and hosts the storage devices.

15. The device as set forth in claim 13, wherein the section discriminant data facilitates a unique mapping of the sections to the storage nodes.

16. The device as set forth in claim 13, wherein the processor coupled to the memory is further configured to execute the machine executable code to further cause the processor to
identify the unowned section based on a determined ownership status of the storage devices.

17. The device as set forth in claim 13, wherein the processor coupled to the memory is further configured to execute the machine executable code to further cause the processor to
resolve a storage conflict comprising reassigning one or more conflicting ones of the storage devices, when a determination indicates that resolution of the storage conflict is safe based on whether each of the conflicting ones of the storage devices currently stores valid data.

18. The device as set forth in claim 13, wherein the storage devices comprise solid state drives comprising flash memory.

* * * * *